US010196045B2

(12) United States Patent
Kim et al.

(10) Patent No.: US 10,196,045 B2
(45) Date of Patent: Feb. 5, 2019

(54) WIPER BLADE ASSEMBLY

(71) Applicant: CAP Corporation, Sangju-si, Gyeongsangbuk-do (KR)

(72) Inventors: Myoung Yeon Kim, Ulsan (KR); Hyung Tae Kim, Incheon (KR)

(73) Assignee: Cap Corporation, Gyeongsangbuk-Do (KR)

( * ) Notice: Subject to any disclaimer, the term of this patent is extended or adjusted under 35 U.S.C. 154(b) by 0 days.

(21) Appl. No.: 15/495,253

(22) Filed: Apr. 24, 2017

(65) Prior Publication Data
US 2017/0225657 A1    Aug. 10, 2017

Related U.S. Application Data

(63) Continuation-in-part of application No. 14/738,330, filed on Jun. 12, 2015, now abandoned.

(30) Foreign Application Priority Data

Jun. 16, 2014    (KR) .................. 10-2014-0072927

(51) Int. Cl.
*B60S 1/38*    (2006.01)
*B60S 1/40*    (2006.01)

(52) U.S. Cl.
CPC ............ *B60S 1/3801* (2013.01); *B60S 1/381* (2013.01); *B60S 1/3806* (2013.01); *B60S 1/40* (2013.01);
(Continued)

(58) Field of Classification Search
CPC .................. B60S 1/0408; B60S 1/3801; B60S 2001/3812; B60S 2001/3813; B60S 2001/3815; B60S 1/381; B60S 1/3806
(Continued)

(56) References Cited

U.S. PATENT DOCUMENTS 2,767,419 A    10/1956    Horton
3,158,890 A *  12/1964    Anderson ............. B60S 1/3801
                                                    15/250.44
(Continued)

FOREIGN PATENT DOCUMENTS

CN    102085849 A    6/2011
CN    103640551 A    3/2014
(Continued)

OTHER PUBLICATIONS

Korean Notice of Allowance dated Sep. 17, 2017 issued in corresponding Korean Application No. 10-2014-0072927 (no English translation).
(Continued)

*Primary Examiner* — Gary K. Graham
(74) *Attorney, Agent, or Firm* — Harness, Dickey & Pierce, P.L.C.

(57) ABSTRACT

The present invention relates to a wiper blade assembly including a primary lever, a secondary lever disposed to be adjacent to the primary lever, a secondary lever connecting structure coupled to the secondary lever, and a yoke member hinge-coupled to the secondary lever connecting structure, wherein the yoke member includes a claw portion, the claw portion being moved apart from the secondary lever and in the present invention, claw portions coupled to both ends of a contact member may be disposed in certain regions of yoke members and the yoke members may be moved apart from secondary levers such that the claw portions may be moved apart from the secondary levers to allow for improvements in the property of following the curvature of glass, thereby wiping performance of a wiper.

5 Claims, 9 Drawing Sheets

(52) U.S. Cl.
CPC ............. *B60S 2001/3812* (2013.01); *B60S 2001/3813* (2013.01); *B60S 2001/3815* (2013.01)

(58) Field of Classification Search
USPC ................. 15/250.201, 250.44, 250.46
See application file for complete search history.

(56) References Cited

U.S. PATENT DOCUMENTS

| | | | |
|---|---|---|---|
| 3,899,800 A | 8/1975 | Wittwer et al. | |
| 4,343,063 A | 8/1982 | Batt | |
| 4,360,941 A | 11/1982 | Mabie | |
| 6,012,197 A * | 1/2000 | Ponziani et al. | B60S 1/3801 15/250.46 |
| 8,966,706 B2 | 3/2015 | Song et al. | |
| 9,187,064 B2 | 11/2015 | Lee et al. | |
| 2010/0139027 A1 | 6/2010 | An et al. | |
| 2011/0131750 A1 | 6/2011 | Kwon et al. | |
| 2012/0174334 A1 | 7/2012 | Song et al. | |
| 2013/0152329 A1 | 6/2013 | Oslizlo et al. | |
| 2014/0041143 A1 | 2/2014 | Kim et al. | |
| 2014/0053361 A1 | 2/2014 | Amano | |

FOREIGN PATENT DOCUMENTS

| | | | |
|---|---|---|---|
| EP | 2338747 | A2 | 6/2011 |
| JP | 2013521192 | A | 6/2013 |
| JP | 2013226863 | A | 11/2013 |
| KR | 20110121861 | A | 11/2011 |
| KR | 10-1134152 | B1 | 4/2012 |
| KR | 2013-0027243 | A | 3/2013 |
| KR | 10-2014-0000779 | A | 1/2014 |
| WO | WO-2011139014 | A2 | 5/2010 |

OTHER PUBLICATIONS

Final Office Action dated Jul. 19, 2017 in co-pending U.S. Appl. No. 14/738,330.
Chinese Office Action dated Feb. 3, 2017 for corresponding CN Application No. 201510330693.5.
Japanese Office Action dated May 10, 2016, issued in corresponding Japanese Patent Application No. 2015-118539.
Korean Office Action dated Jun. 24, 2015, issued in corresponding Korean Patent Application No. 10-2014-0072927.

* cited by examiner

【Fig. 1a】
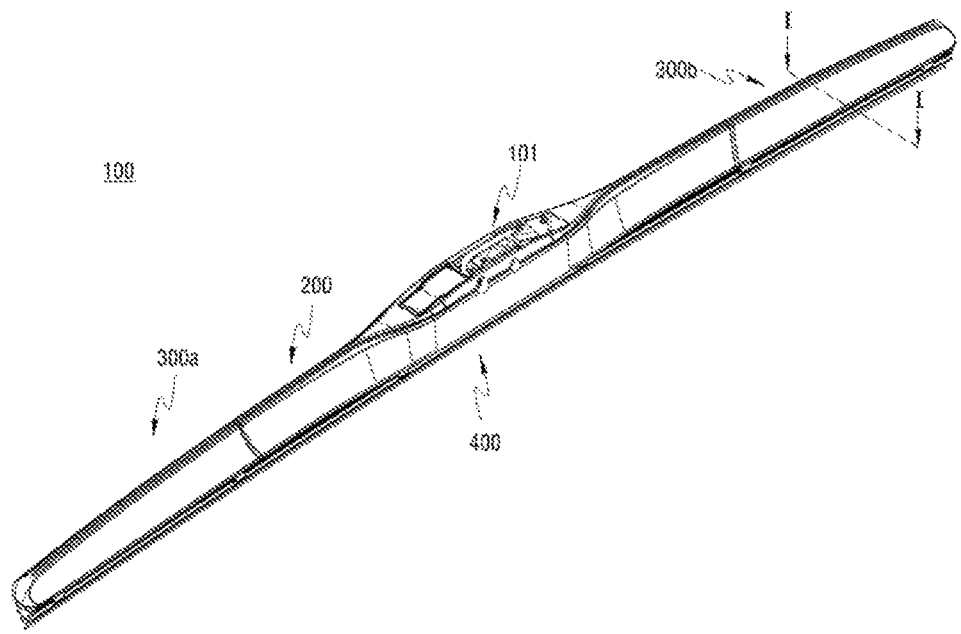

【Fig. 1b】
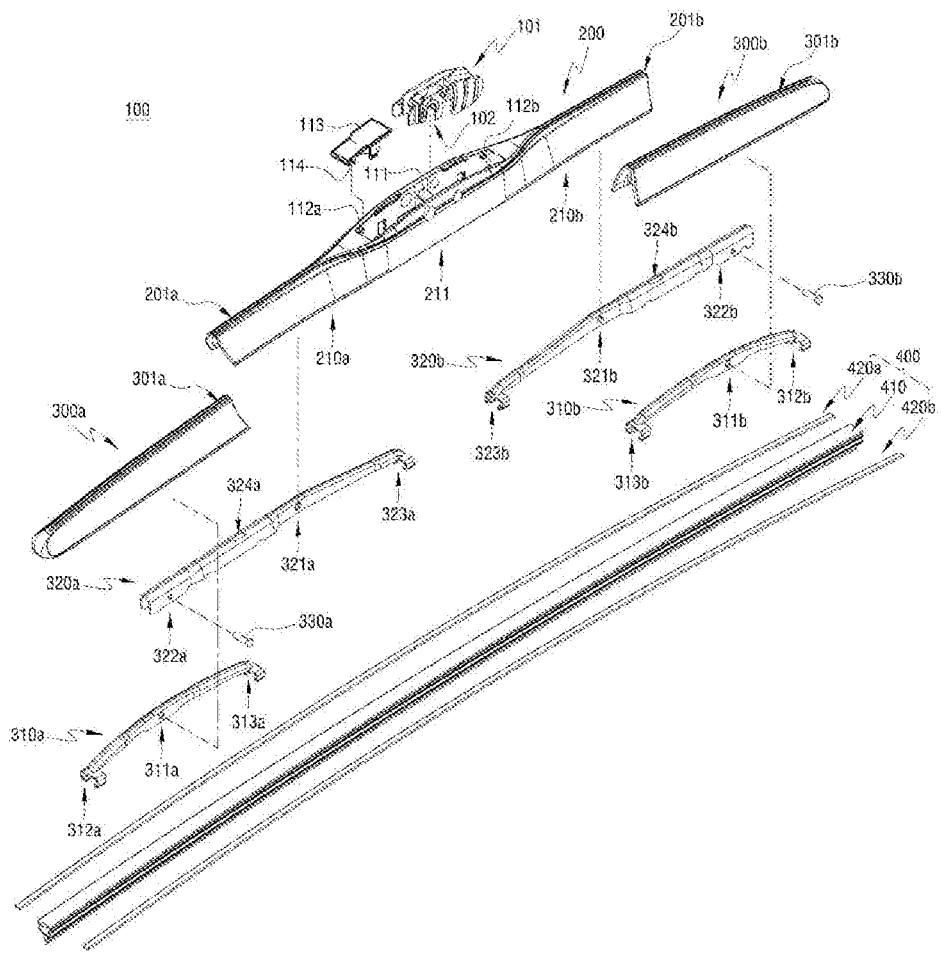
【Fig. 1c】
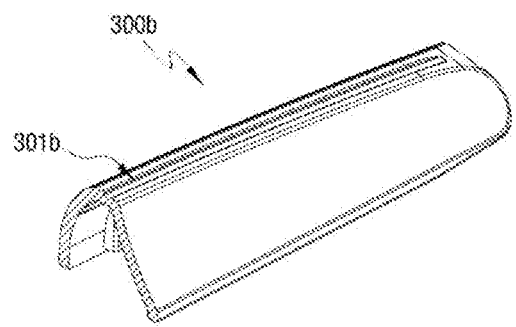

[Fig. 2]
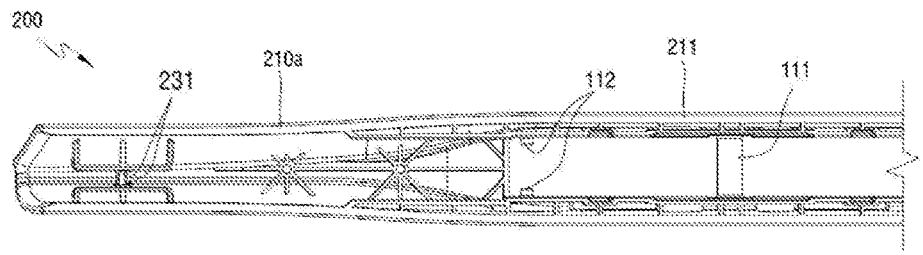
[Fig. 3]
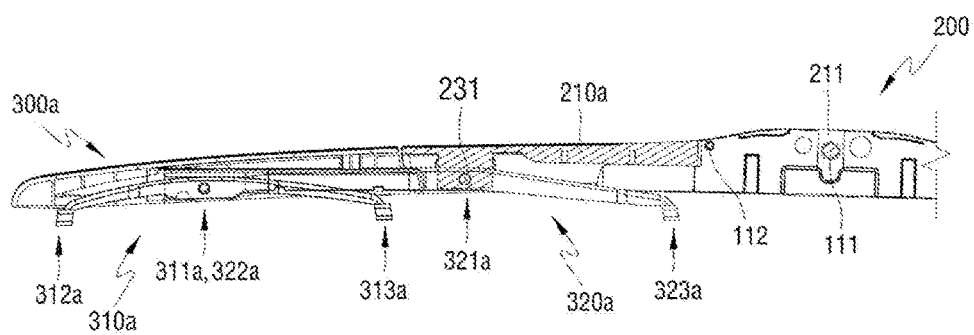
[Fig. 4a]
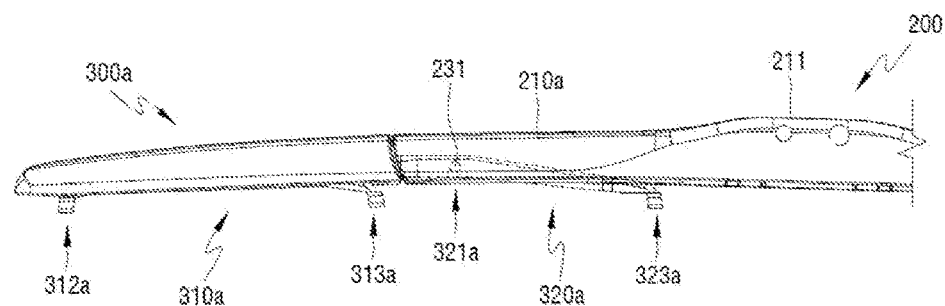
[Fig. 4b]
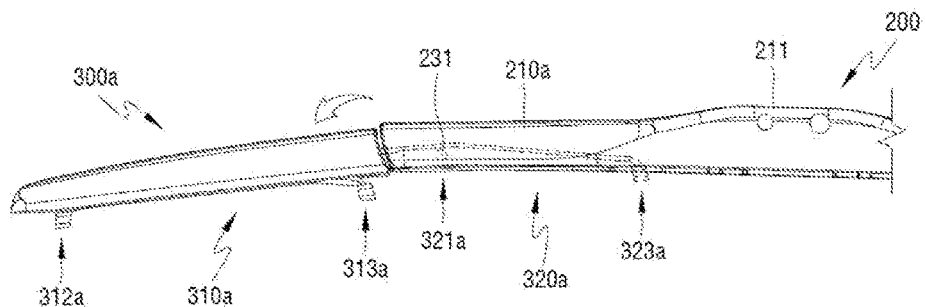

【Fig. 5a】
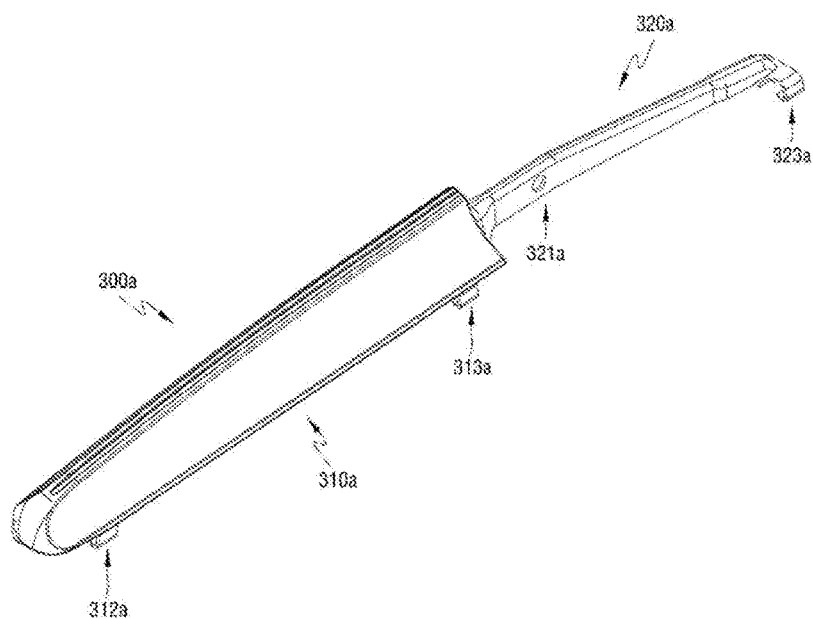
【Fig. 5b】
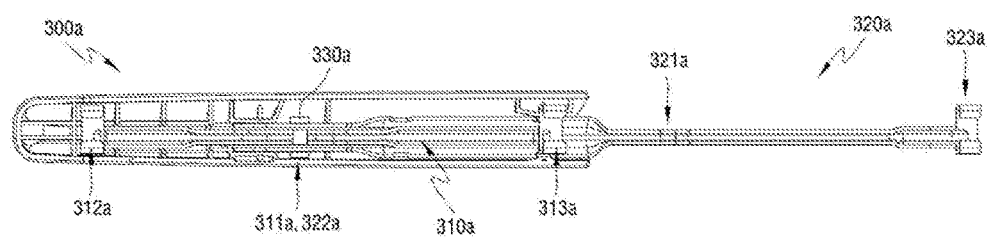
【Fig. 6a】
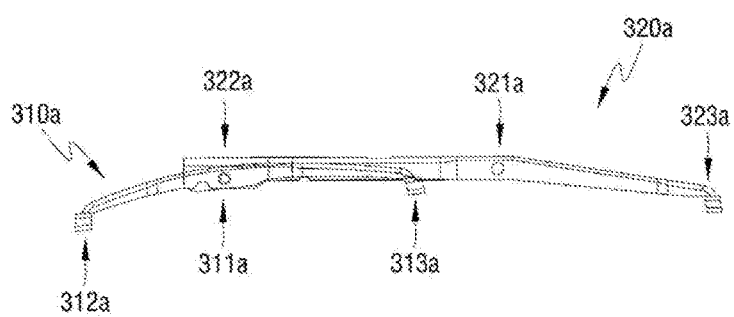

【Fig. 6b】
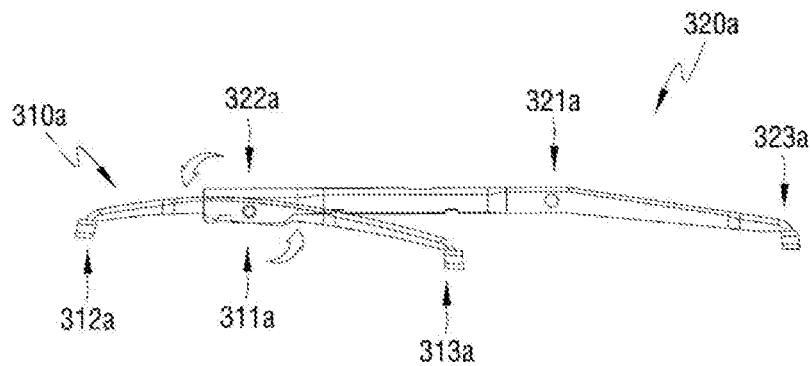
【Fig. 7a】
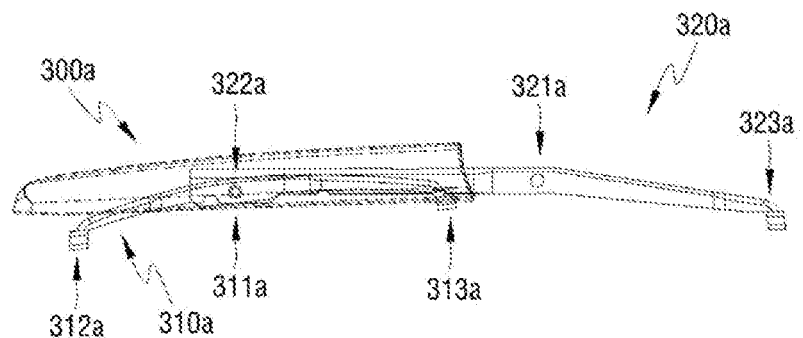
【Fig. 7b】
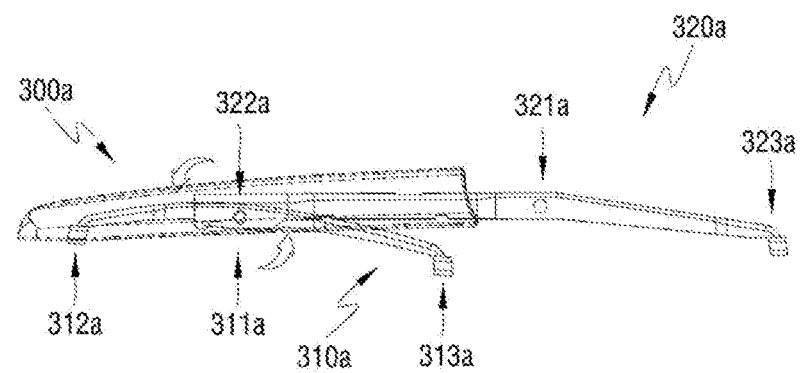

[Fig. 8a]
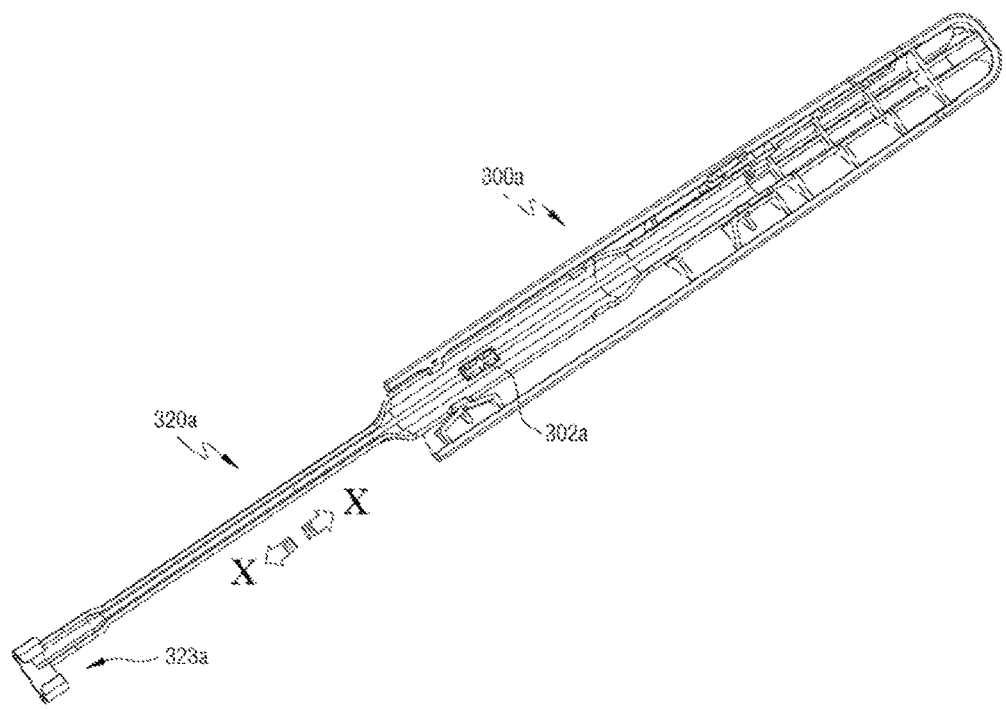

【Fig. 8b】
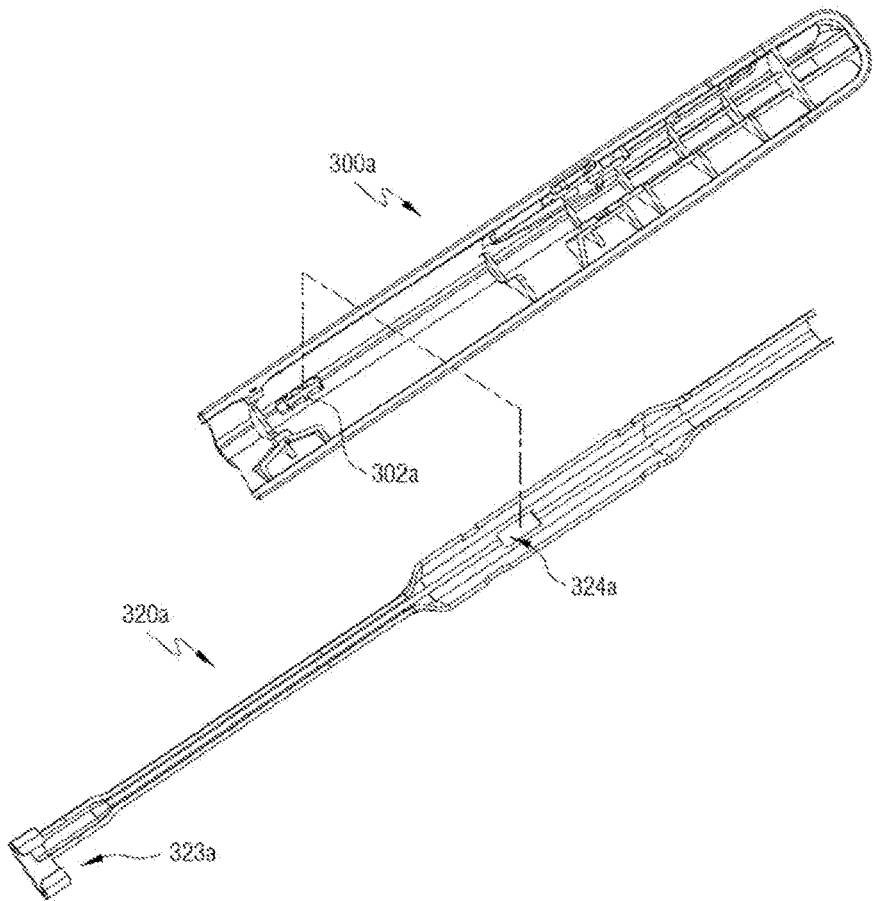
【Fig. 9】
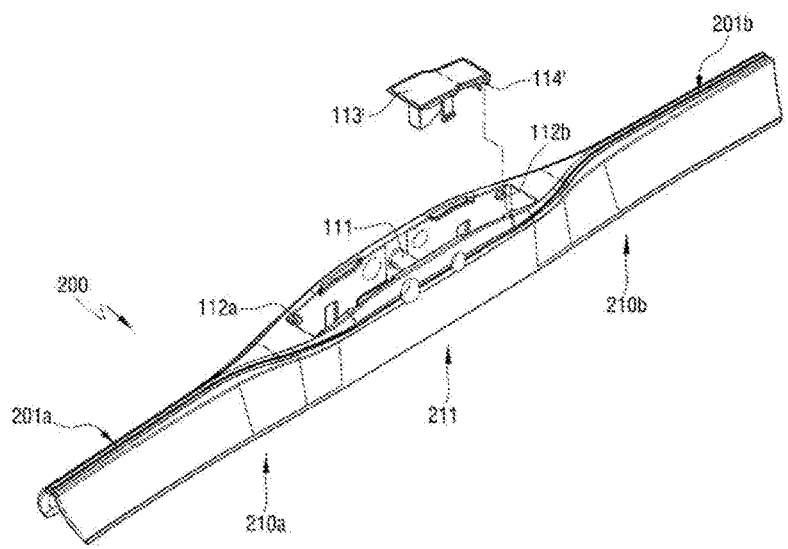

【Fig. 10a】
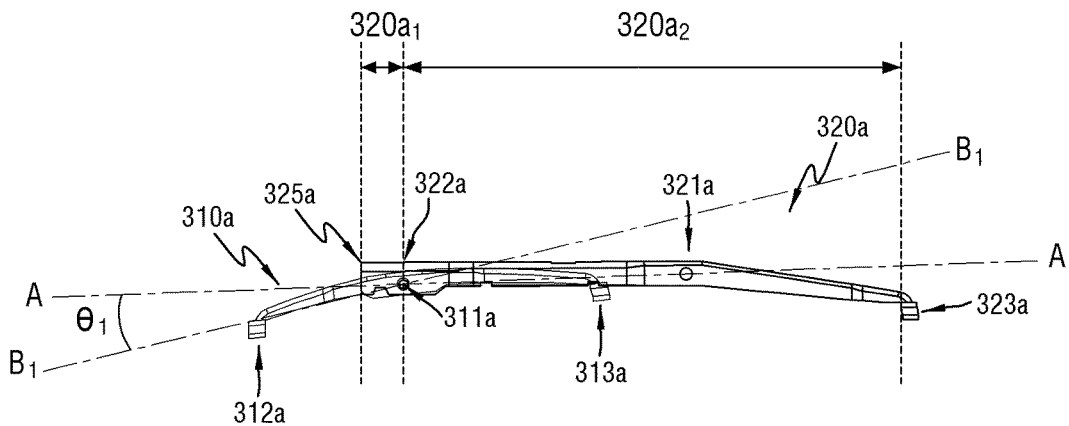
【Fig.10b】
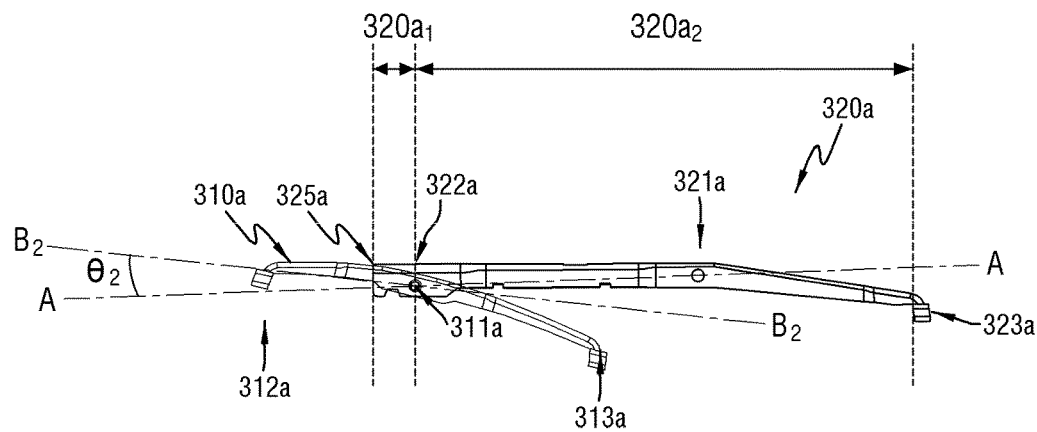
【Fig.10c】
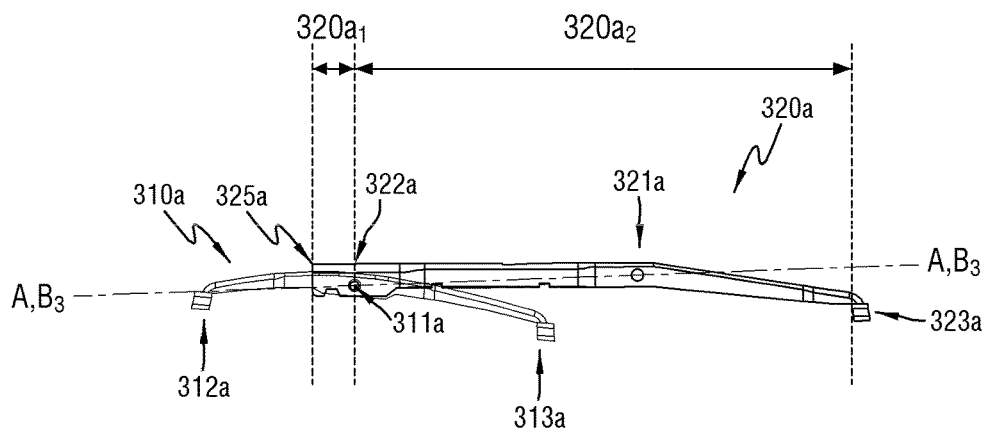

[Fig. 11]
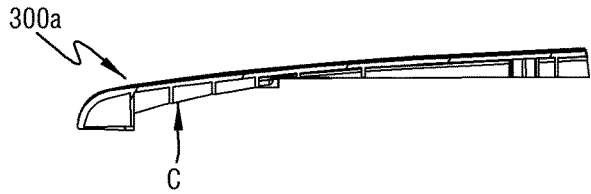
[Fig. 12a]
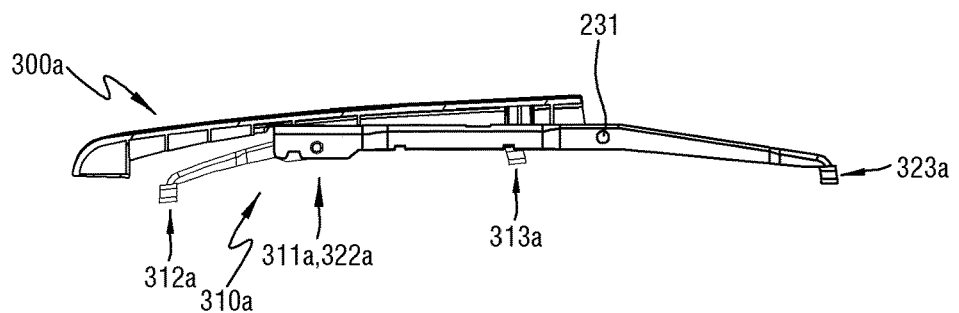
[Fig.12b]
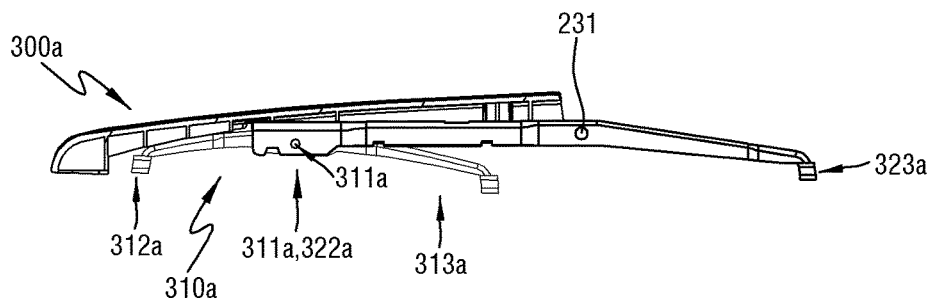
[Fig.12c]
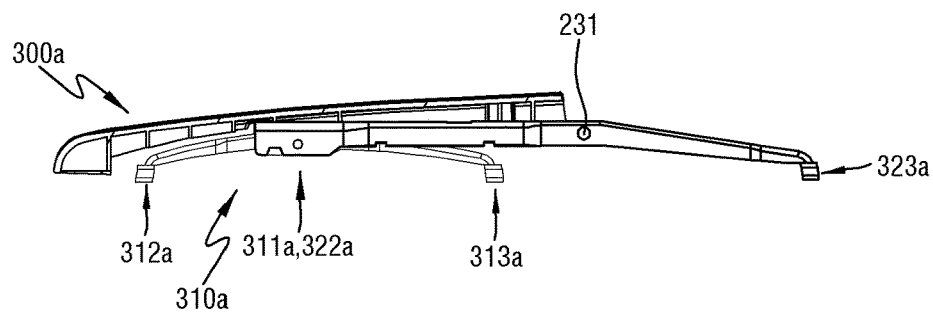

WIPER BLADE ASSEMBLY

CROSS-REFERENCE TO RELATED APPLICATION

This application claims priority under 35 U.S.C. § 121 as a continuation-in-part application of U.S. application Ser. No. 14/738,330, filed Jun. 12, 2015 with the United States Patent and Trademark Office (USPTO), which claims priority under 35 U.S.C. § 119 to Korean Patent Application No. 10-2014-0072927 filed on Jun. 16, 2014 with the Korean Intellectual Property Office, the disclosures of each of which are incorporated herein by reference in their entirety.

BACKGROUND

1. Field of the Invention

The present invention relates to a wiper blade assembly, and more particularly, to a structure of a wiper blade assembly able to better follow the curvature of glass.

2. Description of the Related Art

A wiper blade assembly wipes rain or dirt from a vehicle's windshield to ensure the driver's view. The wiper blade assembly is connected to a wiper arm connected to a driving shaft which is connected to a wiper driving motor on the vehicle side. Thus, the wiper blade assembly is driven by the wiper arm.

The wiper arm and the wiper blade assembly are coupled to each other by a wiper connector. Generally, a member called a clamp is provided in the wiper blade assembly, and a connector member is coupled to the clamp. In a state where the connector member is coupled to the clamp, the wiper arm is coupled to the connector member.

Wiper blade assemblies are broadly classified into three types according to the way a blade closely attached to the surface of a windshield to wipe off dirt is supported.

The first type is a tournament-type wiper in which multi-stage levers are provided, and a blade is supported by ends of each lever.

The tournament-type wiper is the oldest form of wiper assembly. A wiper strip coupled to a linear support member is bent by a plurality of tournament levers to follow the curvature of the vehicle glass. The tournament-type wiper assembly has superior durability since the tournament levers form a stable support point and shows good wiping performance since it can properly follow the curvature of the glass.

However, when a vehicle is driven at high speed, the tournament-type wiper assembly is pulled away from the glass surface of the vehicle by the pressure of air acting on the glass surface. Accordingly, the wiping performance of the tournament-type wiper assembly deteriorates.

To solve this problem, a spoiler member is additionally attached onto each of the tournament levers. In this case, however, since the spoiler member should be additionally manufactured and assembled, the manufacturing costs and weight of parts increase. Also, the addition of the spoiler member impairs the appearance of the vehicle.

The second type is a flat plate-type wiper in which a blade is coupled to and thus supported by a support rail or body spring having a predetermined curvature and elasticity.

The flat plate-type wiper has a low height, is formed integrally with the blade, and has simple appearance.

However, since a windshield has a different curvature according to the vehicle model, it is difficult to perfectly wipe the entire area of the windshield no matter how excellent the elasticity of the body spring is. In addition, when the wiper moves to a point with a different curvature, ends of the wiper may fail to follow the curvature of the windshield, that is, may lift off the surface of the windshield.

To address these problems, a uniblade-type wiper, which is the third type, has been suggested. In the uniblade-type wiper, a flat plate-type wiper is reinforced and supported by a tournament structure.

That is, in a uniblade-type wiper assembly, two tournament levers are installed only in the middle of a tournament wiper strip, and the tournament levers are covered with a cover having a spoiler function and then coupled to the cover.

However, since both ends of the wiper strip are not properly supported in the uniblade-type wiper assembly, the uniblade-type wiper assembly cannot properly follow the curvature of glass.

Accordingly, in order to solve the defects as described above, the applicant filed an application relating to a wide blade assembly, Korean Patent Laid-Open Publication No. 10-2014-0000779.

That is, in the Korean Patent Laid-Open Publication, support portions for preventing the movement of a secondary lever are formed on an inner surface of a spoiler portion of a primary lever. The support portions support the secondary lever to prevent the secondary lever from moving on the inner surface of the spoiler portion of the primary lever when a wiper is or is not in operation. In addition, both ends of a wiper strip connected to the secondary lever may be supported properly to enable the wiper to better follow the curvature of glass, thereby improving the wiping performance of the wiper.

The applicant may intend to improve the Korean Patent Laid-Open Publication to provide a wiper blade assembly able to better follow the curvature of glass.

SUMMARY

An aspect of the present invention may provide a wiper blade assembly able to better follow the curvature of glass in both ends of a contact member.

However, aspects of the present invention are not restricted to the one set forth herein. The above and other aspects of the present invention will become more apparent to one of ordinary skill in the art to which the present invention pertains by referencing the detailed description of the present invention given below.

According to an aspect of the present invention, a wiper blade assembly may include a primary lever; a secondary lever disposed to be adjacent to the primary lever; a secondary lever connecting structure coupled to the secondary lever; and a yoke member hinge-coupled to the secondary lever connecting structure, wherein the secondary lever connecting structure includes a reference hinge portion disposed in a certain region of one end portion of the secondary lever connecting structure, a claw portion disposed in a certain region of the other end portion of the secondary lever connecting structure, and a hinge hole hinge-coupled to one side of the primary lever, the secondary lever connecting structure includes a first region disposed on one side of the first reference hinge portion and a second region disposed on the other side of the first reference hinge portion, the yoke member includes a first claw portion disposed on one end of the yoke member and another first claw portion disposed on the other end of the yoke member, the secondary lever connecting structure includes an imaginary reference line connecting the reference hinge portion and the hinge hole, the yoke member includes an imaginary rotation line connecting the first claw portion disposed on one end of the yoke member and the reference hinge portion, and an angle θ that the reference line forms with the rotation line is determined by a length of the first region of the secondary lever connecting structure.

In the wiper blade assembly according to an aspect of the present invention, the angle θ that the reference line forms with the rotation line may be −30° to +15°.

In the wiper blade assembly according to an aspect of the present invention, the first region of the secondary lever connecting structure may be a region from an end portion of the secondary lever connecting structure to the reference hinge portion of the secondary lever connecting structure, and the second region of the secondary lever connecting structure may be a region from the claw portion of the secondary lever connecting structure to the reference hinge portion of the secondary lever connecting structure.

In the wiper blade assembly according to an aspect of the present invention, the rotation line may be a first rotation line, wherein the first rotation line is a rotation line formed when the first claw portion disposed on one end of the yoke member is pivoted in a first direction, and an angle θ1 that the reference line forms with the first rotation line is 0° to −30°.

In the wiper blade assembly according to an aspect of the present invention, the rotation line may be a second rotation line, wherein the second rotation line is a rotation line formed when the first claw portion disposed on one end of the yoke member is pivoted in a second direction, and an angle θ2 that the reference line forms with the second rotation line is 0° to +15°.

In the wiper blade assembly according to an aspect of the present invention, the rotation line may be a first rotation line or a second rotation line, wherein the first rotation line is a rotation line formed when the first claw portion disposed on one end of the yoke member is pivoted in a first direction, the second rotation line is a rotation line formed when the first claw portion disposed on one end of the yoke member is pivoted in a second direction, as the length of the first region of the secondary lever connecting structure increases, an angle θ2 that the reference line forms with the second rotation line gradually decreases, and as the length of the first region of the secondary lever connecting structure decreases, the angle θ2 that the reference line forms with the second rotation line gradually increases.

BRIEF DESCRIPTION OF DRAWINGS

FIG. 1a is a coupled perspective view of a wiper blade assembly according to the present invention; FIG. 1b is an exploded perspective view of the wiper blade assembly according to the present invention; and FIG. 1c is a cut-away perspective view taken along line I-I of FIG. 1a.

FIG. 2 is a partial bottom view of a primary lever according to the present invention.

FIG. 3 is a schematic cross-sectional view illustrating connection relationships among the primary lever, a secondary lever, a secondary lever connecting structure, and a yoke member.

FIG. 4a and FIG. 4b are schematic views illustrating hinge-coupling of the primary lever and the secondary lever connecting structure according to the present invention.

FIG. 5a and FIG. 5b are views illustrating a state in which the secondary lever and the secondary lever connecting structure are coupled to each other.

FIG. 6a and FIG. 6b are views illustrating pivoting of the yoke member and the secondary lever connecting structure.

FIG. 7a and FIG. 7b are views illustrating pivoting of the yoke member and the secondary lever.

FIG. 8a and FIG. 8b are schematic perspective views illustrating a coupling state between the secondary lever connecting structure and the secondary lever.

FIG. 9 is a partial perspective view illustrating a common use of the wiper blade assembly according to the present invention.

FIGS. 10a through 10c are views illustrating the rotation angle of the yoke member.

FIG. 11 is a schematic cross-sectional view illustrating a first secondary lever according to the present invention.

FIGS. 12a through 12c are views illustrating limiting of the rotation angle of the yoke member by the secondary lever.

DETAILED DESCRIPTION

Advantages and features of the present invention and methods of accomplishing the same may be understood more readily by reference to the following detailed description of exemplary embodiments and the accompanying drawings. The present invention may, however, be embodied in many different forms and should not be construed as being limited to the embodiments set forth herein. Rather, these embodiments are provided so that this disclosure will be thorough and complete and will fully convey the concept of the invention to those skilled in the art, and the present invention will only be defined by the appended claims.

The present invention will now be described more fully with reference to the accompanying drawings, in which exemplary embodiments of the invention are shown. Like reference numerals refer to like elements throughout the specification. As used herein, the term "and/or" includes any and all combinations of one or more of the associated listed items.

It will be understood that, although the terms first, second, third, etc., may be used herein to describe various elements, these elements should not be limited by these terms. These terms are only used to distinguish one element from another element. Thus, a first element discussed below could be termed a second element without departing from the teachings of the present invention.

The terminology used herein is for the purpose of describing particular embodiments only and is not intended to be limiting of the invention. As used herein, the singular forms are intended to include the plural forms as well, unless the context clearly indicates otherwise. It will be further understood that the terms "comprises" and/or "comprising," when used in this specification, specify the presence of stated elements, but do not preclude the presence or addition of one or more other elements.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Spatially relative terms, such as "below", "beneath", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "below" or "beneath" other elements or features would then be oriented "above" the other elements or features. Thus, the exemplary term "below" or "beneath" can encompass both an orientation of above and below. The device may be otherwise oriented and the spatially relative descriptors used herein interpreted accordingly.

Hereinafter, exemplary embodiments of the present invention will be described in detail with reference to the attached drawings.

FIG. 1a is a coupled perspective view of a wiper blade assembly according to the present invention; FIG. 1b is an exploded perspective view of the wiper blade assembly according to the present invention; and FIG. 1c is a cut-away perspective view taken along line I-I of FIG. 1a.

First, referring to FIG. 1a and FIG. 1b, a wiper blade assembly 100 according to the present invention may include a primary lever 200, secondary levers 300a and 300b disposed to be adjacent to the primary lever 200, secondary lever connecting structures 320a and 320b coupled to the secondary levers 300a and 300b, yoke members 310a and 310b hinge-coupled to the secondary lever connecting structures 320a and 320b, and a contact member 400 coupled to the yoke members.

More specifically, the secondary levers 300a and 300b may include a first secondary lever 300a disposed at one end of the primary lever 200 and a second secondary lever 300 disposed at the other end of the primary lever 200, and the secondary lever connecting structures 320a and 320b may include a first secondary lever connecting structure 320a coupled to the first secondary lever and a second secondary lever connecting structure 320b coupled to the second secondary lever.

In addition, the yoke members 310a and 310b may include a first yoke member 310a hinge-coupled to the first secondary lever connecting structure 320a and a second yoke member 310b hinge-coupled to the second secondary lever connecting structure 320b.

In this case, the first yoke member 310a and the second yoke member 310b may include hinge holes 311a and 311b hinge-coupled to the first and second secondary lever connecting structures 320a and 320b, respectively.

More specifically, the first yoke member 310a may include a first hinge hole 311a and the second yoke member 310b may include a second hinge hole 311b, and the respective yoke members may be hinge-coupled to the secondary lever connecting structures 320a and 320b.

In addition, the yoke members 310a and 310b slidably support the contact member. The first yoke member 310a may include first claw portions 312a and 313a at both ends thereof, respectively. The second yoke member 310b may include second claw portions 312b and 313b at both ends thereof, respectively.

More specifically, the first claw portions 312a and 313a may include a first claw portion 312a disposed on one end of the first yoke member 310a and another first claw portion 313a disposed on the other end of the first yoke member 310a.

In addition, the second claw portions 312b and 313b may include a second claw portion 312b disposed on one end of the second yoke member 310b and another second claw portion 313b disposed on the other end of the second yoke member 310b.

Here, the yoke members 310a and 310b may be identical to yokes used in a conventional tournament-type wiper assembly. Therefore, the shape and structure of the yoke members are not limited to those illustrated in the present invention.

Meanwhile, as described above, the secondary lever connecting structures 320a and 320b may include the first secondary lever connecting structure 320a coupled to the first secondary lever and the second secondary lever connecting structure 320b coupled to the second secondary lever.

In this case, the first secondary lever connecting structure 320a may include a first reference hinge portion 322a disposed in a certain region of one end portion thereof and a third claw portion 323a disposed in a certain region of the other end portion thereof. The first secondary lever connecting structure 320a may include a third hinge hole 321a positioned between the first reference hinge portion 322a and the third claw portion 323a and hinge-coupled to one end portion of the primary lever 200.

In addition, the second secondary lever connecting structure 320b may include a second reference hinge portion 322b disposed in a certain region of one end portion thereof and a fourth claw portion 323b disposed in a certain region of the other end portion thereof. The second secondary lever connecting structure 320b may include a fourth hinge hole 321b positioned between the second reference hinge portion 322b and the fourth claw portion 323b and hinge-coupled to the other end portion of the primary lever 200.

Continuously referring to FIG. 1a and FIG. 1b, the wiper blade assembly 100 according to the present invention may include the contact member 400 coupled to the yoke members and the secondary lever connecting structures.

More specifically, as described above, the yoke members 310a and 310b slidably support the contact member. The first yoke member 310a may include the first claw portions 312a and 313a at the both ends thereof, respectively. The second yoke member 310b may include the second claw portions 312b and 313b at the both ends thereof, respectively.

That is, the first claw portions 312a and 313a may include the first claw portion 312a disposed on one end of the first yoke member 310a and the first claw portion 313a disposed on the other end of the first yoke member 310a. In addition, the second claw portions 312b and 313b may include the second claw portion 312b disposed on one end of the second yoke member 310b and the second claw portion 313b disposed on the other end of the second yoke member 310b.

In addition, the secondary lever connecting structures 320a and 320b may include the first secondary lever connecting structure 320a coupled to the first secondary lever and the second secondary lever connecting structure 320b coupled to the second secondary lever.

In this case, the first secondary lever connecting structure 320a may include the third claw portion 323a disposed in the certain region of the other end portion thereof, and the second secondary lever connecting structure 320b may include the fourth claw portion 323b disposed in the certain region of the other end portion thereof.

In the present invention, the coupling of the contact member to the yoke members and the secondary lever connecting structures means that the contact member is coupled to the first claw portion 312a, the first claw portion 313a, the third claw portion 323a, the fourth claw portion 323b, the second claw portion 312b, and the second claw portion 313b.

Meanwhile, the contact member 400 may include a wiper strip 410 and support members 420a and 420b supporting the wiper strip 410.

The wiper strip 410 is typically made of a rubber material. The wiper strip 410 may include grooves (no reference numerals given) in both sides thereof to be coupled to the support members 420a and 420b.

The support members 420a and 420b are typically elastic and support the wiper strip 410. The support members 420a and 420b may be inserted into and coupled to the grooves formed in the both sides of the wiper strip 410. In the drawings, two separate support members, i.e., a first support member 420a and a second support member 420b are illustrated. However, the wiper strip 410 may also be supported by a single support member.

Meanwhile, in the present invention, the contact member 400 may be modified according to the need of a user. Therefore, a shape and a structure of the contact member 400 are not limited to those illustrated in the present invention.

Continuously referring to FIG. 1a and FIG. 1b, the primary lever 200 of the wiper blade assembly 100 according to the present invention may include a first spoiler portion 210a hinge-coupled to the first secondary lever connecting structure 320a, on one end thereof and a second spoiler portion 210b hinge-coupled to the second secondary lever connecting structure 320b, on the other end thereof.

In addition, referring to FIG. 1a and FIG. 1b, the wiper blade assembly 100 according to the present invention may include a connector 101 coupled to a certain region 211 of the primary lever 200 and connected to a wiper arm, and may also include a connecting pin 111 to which the connector is coupled.

The connector 101 is generally called a wiper arm connector. The connector 101 may be accommodated in the certain region of the primary lever and may be connected to the wiper arm (not shown) having a U-shaped hook at an end thereof.

In this case, the connector 101 may include a pinhole 102 coupled to the connecting pin 111. The pinhole 102 may be inserted into or removed from the connecting pin 111 by interference fitting.

In addition, the wiper blade assembly 100 according to the present invention may include a cap portion 113 installed to be hinge-opened or closed, in the certain region 211 of the primary lever 200.

In this case, the primary lever 200 may include a first projection 112a to which the cap portion 113 is hinge-coupled, on one side of the certain region 211 thereof, and may include a second projection 112b to which the cap portion 113 is hinge-coupled, on the other side of the certain region 211 thereof.

That is, the cap portion 113 may be hinge-coupled to the first projection 112a or may be hinge-coupled to the second projection 112b.

FIG. 9 is a partial perspective view illustrating a common use of the wiper blade assembly according to the present invention.

That is, unlike FIG. 1b, FIG. 9 illustrates a case in which a cap portion 113' is hinge-coupled to the second projection 112b.

In general, the wiper arm is connected to a driving shaft connected to a wiper driving motor on a vehicle side, and the wiper blade assembly may be driven by the driving of the wiper arm.

In the driving of the wiper arm, a position of the driving shaft of the wiper arm may be varied depending on whether a vehicle is an LH vehicle (vehicle in which a driver is positioned on the left side thereof) or an RH vehicle (vehicle in which a driver is positioned on the right side thereof).

Thus, a position in which the cap portion 113 is hinge-coupled to the first projection 112a or is hinge-coupled to the second projection 112b may be determined on whether a vehicle is an LH vehicle or an RH vehicle.

That is, in the present invention, assuming that for example, the cap portion 113 is hinge-coupled to the first projection 112a in the LH vehicle, since the cap portion 113 may be hinge-coupled to the second projection 112b in the RH vehicle, a wide blade assembly applicable to both the LH vehicle and the RH vehicle in common may be provided.

In this case, reference numerals 114 and 114' of FIG. 1b and FIG. 9, which have not been yet explained, correspond to a coupling portion of the cap portion. The cap portion 113 may be hinge-coupled to the first projection 112a or the second projection 112b by the coupling portion thereof.

The connector according to the present invention may be employed or replaced according to a type of the wiper arm. Therefore, a shape and a structure of the connector are not limited to those illustrated in the present invention.

Further, referring to FIG. 1a through FIG. 1c, as described above, the wiper blade assembly 100 according to the present invention may include the primary lever 200 and the secondary levers 300a and 300b disposed to be adjacent to the primary lever 200. The secondary levers 300a and 300b may include a first secondary lever 300a disposed at one end of the primary lever 200 and a second secondary lever 300 disposed at the other end of the primary lever 200.

In this case, the primary lever and the secondary levers may include longitudinal grooves disposed in certain regions of top end portions thereof. More specifically, the primary lever 200 may include primary lever grooves 201a and 201b disposed in certain regions of a top end portion thereof, and the first secondary lever 300a and the second secondary lever 300b may include secondary lever grooves 301a and 301b disposed in certain regions of the respective top end portions thereof.

The primary lever grooves 201a and 201b and the secondary lever grooves 301a and 301b may generate a vortex to the wind applied to the wiper blade assembly, in regions of the primary lever grooves 201a and 201b and the secondary lever grooves 301a and 301b.

The generated vortex may provide a degree of pressure allowing the wiper blade assembly to be adhered to a window surface, whereby adhesion properties of the wiper blade assembly may be improved.

Meanwhile, reference numerals 330a and 330b, which have not been yet explained, correspond to a first coupling member and a second coupling member, respectively. As described later, these coupling members may be inserted into the reference hinge portions disposed in certain regions of respective one end portions of the secondary lever connecting structures, and may enable the secondary lever connecting structures and the yoke members to be hinge-coupled to each other.

Hereinafter, a configuration of the wiper blade assembly 100 according to the present invention will be described in detail.

FIG. 2 is a partial bottom view of a primary lever according to the present invention.

Referring to FIG. 2, as described above, the primary lever 200 may include the first spoiler portion 210a hinge-coupled to the first secondary lever connecting structure (not shown), on one end thereof.

In this case, the first spoiler portion 210a may include a hinge axis portion 231 in a certain region of one end portion thereof, and the first secondary lever connecting structure (not shown) may be hinge-coupled to the hinge axis portion 231.

That is, in FIG. 1*b* described above, the first secondary lever connecting structure 320*a* may include the first reference hinge portion 322*a* disposed in a certain region of one end portion thereof and the third claw portion 323*a* disposed in a certain region of the other end portion thereof. The first secondary lever connecting structure 320*a* may include the third hinge hole 321*a* positioned between the first reference hinge portion 322*a* and the third claw portion 323*a* and hinge-coupled to one end portion of the primary lever 200.

In this case, the hinge axis portion 231 may be coupled to the third hinge hole 321*a*.

That is, in the present invention, the hinge axis portion 231 disposed in the first spoiler portion 210*a* and the third hinge hole 321*a* of the first secondary lever connecting structure 320*a* may be hinge-coupled to each other, such that the first spoiler portion 210*a* and the first secondary lever connecting structure 320*a* may be hinge-coupled to each other.

Meanwhile, although not illustrated in the drawings, the second spoiler portion may include the hinge axis portion, such that the second spoiler portion and the second secondary lever connecting structure may be hinge-coupled to each other.

FIG. 3 is a schematic cross-sectional view illustrating connection relationships among the primary lever, the secondary lever, the secondary lever connecting structure, and the yoke member.

That is, connection relationships among the primary lever, the secondary lever, the secondary lever connecting structure, and the yoke member in FIG. 3 are as follows. However, hereinafter, connection relationships among the first secondary lever, the first secondary lever connecting structure, and the first yoke member will be explained, which may be identical to connection relationships among the second secondary lever, the second secondary lever connecting structure, and the second yoke member.

First, as described above, the primary lever 200 may include the first spoiler portion 210*a* hinge-coupled to the first secondary lever connecting structure 320*a*, on one end thereof.

The secondary levers 300*a* and 300*b* may include the first secondary lever 300*a* disposed at one end of the primary lever 200, and the secondary lever connecting structures 320*a* and 320*b* may include the first secondary lever connecting structure 320*a* coupled to the first secondary lever.

In addition, the yoke members may include the first yoke member 310*a* hinge-coupled to the first secondary lever connecting structure 320*a*, and the first yoke member 310*a* may include the first hinge hole 311*a*.

In addition, the first secondary lever connecting structure 320*a* may include the first reference hinge portion 322*a* disposed in a certain region of one end portion thereof.

In this case, in a state in which the first hinge hole 311*a* and the first reference hinge portion 322*a* are arranged, the first coupling member 330*a* may be inserted into the first hinge hole 311*a* and the first reference hinge portion 322*a*, whereby the first yoke member 310*a* may be hinge-coupled to the first secondary lever connecting structure 320*a*.

Meanwhile, in a state in which the first yoke member 310*a* is hinge-coupled to the first secondary lever connecting structure 320*a* by the first coupling member 330*a*, the first secondary lever connecting structure 320*a* may be coupled to the first secondary lever 300*a*.

FIG. 5*a* and FIG. 5*b* are views illustrating a state in which the secondary lever and the secondary lever connecting structure are coupled to each other. As illustrated in FIG. 5*a* and FIG. 5*b*, the first secondary lever connecting structure 320*a* may be inserted into the first secondary lever 300*a* by interference fitting, such that the first secondary lever connecting structure 320*a* may be fixed to the first secondary lever 300*a*.

In this case, in the present invention, the first secondary lever connecting structure 320*a* may be completely fixed to the first secondary lever 300*a* to be integrally formed therewith.

This is to stably couple the first secondary lever connecting structure 320*a* and the first secondary lever 300*a* together. Due to the stable coupling therebetween, a phenomenon in which the first secondary lever connecting structure 320*a* is separated or moved apart from the first secondary lever 300*a* may be prevented.

Meanwhile, in the present invention, to prevent the first secondary lever connecting structure 320*a* from being separated or moved apart from the first secondary lever 300*a*, the following configuration may be further included.

FIG. 8*a* and FIG. 8*b* are schematic perspective views illustrating a coupling state between the secondary lever connecting structure and the secondary lever.

As illustrated in FIG. 8*a* and FIG. 8*b*, the first secondary lever 300*a* may include a stopper portion 302*a* in a certain region of the interior thereof, and the first secondary lever connecting structure 320*a* may include a hole 324 in a certain region thereof.

That is, in fixing the first secondary lever connecting structure 320*a* to the first secondary lever 300*a*, the stopper portion 302*a* may be inserted into and fixed to the hole 324*a*. By the fixation, a phenomenon in which the first secondary lever connecting structure 320*a* is separated or moved apart from the first secondary lever 300*a* in an X-direction shown in FIG. 8*a* may be prevented.

Meanwhile, even in the case that the first secondary lever connecting structure 320*a* is fixed to the first secondary lever 300*a*, since the first yoke member 310*a* is hinge-coupled to the first secondary lever connecting structure 320*a* by the first coupling member 330*a*, the first yoke member 310*a* may pivot on the first reference hinge portion.

FIG. 6*a* and FIG. 6*b* are views illustrating pivoting of the yoke member and the secondary lever connecting structure.

As illustrated in FIG. 6*a* and FIG. 6*b*, the first yoke member 310*a* may pivot on the first reference hinge portion 322*a*.

As described above, the first yoke member 310*a* may include the first claw portions 312*a* and 313*a* at the both ends thereof, respectively. That is, the first claw portions 312*a* and 313*a* may include the first claw portion 312*a* disposed on one end of the first yoke member 310*a* and the first claw portion 313*a* disposed on the other end of the first yoke member 310*a*.

In this case, the contact member according to the present invention may be coupled to the first claw portion 312*a* disposed on one end of the first yoke member 310*a* and the first claw portion 313*a* disposed on the other end of the first yoke member 310.

That is, in the present invention, the pivoting of the first yoke member 310*a* on the first reference hinge portion 322*a* means that the first claw portion 312*a* and the first claw portion 313*a* are pivotally rotatable and consecutively, means improvements in the property of following the curvature of glass in the contact member to which the first claw portion 312*a* and the first claw portion 313*a* are coupled.

This may have significant effects on the first claw portion 312a coupled to one end of the contact member. As can be seen in FIG. 3a through FIG. 3c of Korean Patent Laid-Open Publication No. 10-2014-0000779, in general, the claw portions coupled to both ends of the contact member may be integrally formed with the secondary levers.

In addition, since the secondary levers may be formed of a hard material, it may be difficult to improve the property of following the curvature of glass in the ends of the contact member.

However, the first claw portion 312a coupled to one end of the contact member may pivot on the first reference hinge portion 322a, thereby allowing for improvements in the property of following the curvature of glass in the ends of the contact member in the present invention.

The characteristics of the present invention can be explained as follows.

FIG. 7a and FIG. 7b are views illustrating pivoting of the yoke member and the secondary lever.

Referring to FIG. 7a and FIG. 7b, as described above, in general, since the claw portions coupled to the both ends of the contact member are integrally formed with the secondary levers, the claw portions coupled to the both ends of the contact member may be constrained by movement of the secondary levers.

However, in the present invention, the claw portions coupled to the both ends of the contact member may be disposed in certain regions of the yoke members, and the yoke member may be moved apart from the secondary levers.

That is, for example, the first claw portion 312a disposed on one end of the first yoke member 310a may be moved apart from the first secondary lever 300a.

Meanwhile, although not illustrated in the drawings, even in the second claw portion 312b disposed on one end of the second yoke member 310b, coupled to the other end of the contact member, the same effects as those in the first claw portion 312a may be generated.

Continuously referring to FIG. 3, in a state in which the first secondary lever connecting structure 320a and the first secondary lever 300a are fixed to each other, the first secondary lever connecting structure 320a may be hinge-coupled to the first spoiler portion 210a.

FIG. 4a and FIG. 4b are schematic views illustrating hinge-coupling of the primary lever and the secondary lever connecting structure according to the present invention.

As illustrated in FIG. 4a and FIG. 4b, the first spoiler portion 210a may include the hinge axis portion 231 in a certain region of one end portion thereof, and the third hinge hole 321a of the first secondary lever connecting structure 320a may be hinge-coupled to the hinge axis portion 231.

In addition, as described above, the first secondary lever connecting structure 320a may be coupled to the first secondary lever 300a to be fixed thereto.

Accordingly, the hinge-coupling of the primary lever and the first secondary lever connecting structure in the present invention may be understood as hinge-coupling of the primary lever and the first secondary lever That is, as illustrated in FIG. 4a and FIG. 4b, the first secondary lever connecting structure 320a may pivot from the first spoiler portion 210a and consequently, it means that the first secondary lever may pivot from the first spoiler portion 210a.

Thus, in the present invention, by the hinge-coupling of the primary lever and the first secondary lever connecting structure, the first secondary lever connecting structure 320a may improve the property of following the curvature of glass in the contact member coupled to the third claw portion 323a disposed in a certain region of the other end portion thereof.

In addition, since the first secondary lever may pivot from the first spoiler portion 210a by the hinge-coupling of the primary lever and the first secondary lever connecting structure, that is, due to the pivoting of the first secondary lever, the property of following the curvature of glass in the contact member to which the first claw portion 312a disposed on one end of the first yoke member 310a and the first claw portion 313a disposed on the other end of the first yoke member 310a are coupled may be further improved.

As set forth above, according to the present invention, the claw portions coupled to the both ends of the contact member may be disposed in certain regions of the yoke members and the yoke members may be moved apart from the secondary levers, such that the claw portions may be moved apart from the secondary levers to allow for improvements in the property of following the curvature of glass, thereby wiping performance of the wiper.

The pivoting of the yoke member and the secondary lever connecting structure according to the present invention will hereinafter be described.

FIGS. 10a through 10c are views illustrating the rotation angle of the yoke member according to the present invention.

Specifically, the pivoting of the first secondary lever connecting structure 320a and the first yoke member 310a will hereinafter be described, and the pivoting of the second secondary lever connecting structure 320b may be understood from the description of the pivoting of the first secondary lever connecting structure 320a and the first yoke member 310a.

Referring to FIGS. 10a through 10c, the first secondary lever connecting structure 320a includes a first reference hinge portion 322a disposed in a certain region of one end portion thereof, a third claw portion 323a disposed in a certain region of the other end portion thereof, and a third hinge hole 321a positioned between the first reference hinge portion 322a and the third claw portion 323a and hinge-coupled to one end portion of the primary lever 200.

The first secondary lever connecting structure 320a includes a first region $320a_1$ disposed on one side of the first reference hinge portion 322a and a second region $320a_2$ disposed on the other side of the first reference hinge portion 322a.

Specifically, as illustrated in FIGS. 10a through 10c, the first secondary lever connecting structure 320a includes a first end portion 325a disposed at one end thereof and a third claw portion 323a disposed at the other end thereof.

The first region $320a_1$ of the first secondary lever connecting structure 320a may be defined as being a region ranging from the first end portion 325a to the first reference hinge portion 322a, and the second region $320a_2$ of the first secondary lever connecting structure 320a may be defined as being a region ranging from the third claw portion 323a to the first reference hinge portion 322a.

As described above, the first yoke member 310a may include the first claw portions 312a and 313a at both ends thereof, respectively. Specifically, the first claw portions 312a and 313a include the first claw portion 312a disposed on one end of the first yoke member 310a and the first claw portion 313a disposed on the other end of the first yoke member 310a.

The first yoke member 310a may pivot on the first reference hinge portion 322a.

The rotation angle of the first yoke member 310a may be limited by the first secondary lever connecting structure 320a during the pivoting of the first yoke member 310a on the first reference hinge portion 322a.

FIG. 10a illustrates a state in which the first claw portion 312a at one end of the first yoke member 310a is pivoted to its maximum in a first direction, i.e., in a downward direction, FIG. 10b illustrates a state in which the first claw portion 312a at one end of the first yoke member 310a is pivoted to its maximum in a second direction, i.e., in an upward direction, and FIG. 10c illustrates an intermediate state between the state of FIG. 10a and the state of FIG. 10b.

Referring first to FIG. 10a, the first secondary lever connecting structure 320a includes an imaginary reference line A-A connecting the first reference hinge portion 322a and the third hinge hole 321a.

The first yoke member 310a includes an imaginary first rotation line B1-B1 connecting the first claw portion 312a and the first reference hinge portion 322a.

An angle θ1 that the reference line A-A forms with the first rotation line B1-B1 may preferably be 0° to 30°.

That the angle θ1 is 0° means that the reference line A-A and the first rotation line B1-B1 coincides with each other.

The angle θ1 of FIG. 10a corresponds with the state in which the first claw portion 312a at one end of the first yoke member 310a is pivoted to its maximum in the first direction, i.e., in the downward direction, so that the first rotation line B1-B1 is moved in a minus (−) direction with respect to the reference line A-A.

Accordingly, the angle θ1 may be defined as ranging from 0° to −30°.

Referring to FIG. 10b, the first secondary lever connecting structure 320a includes the imaginary reference line A-A connecting the first reference hinge portion 322a and the third hinge hole 321a.

The first yoke member 310a includes an imaginary second rotation line B2-B2 connecting the first claw portion 312a and the first reference hinge portion 322a.

An angle θ2 that the reference line A-A forms with the second rotation line B2-B2 may preferably be 0° to 15°.

That the angle θ2 is 0° means that the reference line A-A and the second rotation line B2-B2 coincides with each other.

The angle θ2 of FIG. 10b corresponds with the state in which the first claw portion 312a at one end of the first yoke member 310a is pivoted to its maximum in the second direction, i.e., in the upward direction, so that the second rotation line B2-B2 is moved in a plus (+) direction with respect to the reference line A-A.

Accordingly, the angle θ2 may be defined as ranging from 0° to +15°.

Referring to FIG. 10c, the first secondary lever connecting structure 320a includes an imaginary reference line A-A connecting the first reference hinge portion 322a and the third hinge hole 321a.

The first yoke member 310a includes an imaginary third rotation line B3-B3 connecting the first claw portion 312a and the first reference hinge portion 322a.

An angle θ3 that the reference line A-A forms with the third rotation line B3-B3 may be 0°, which means the reference line A-A coincides with the third rotation line B3-B3, as illustrated in FIG. 10c.

Given all the above, an angle θ that the reference line A-A connecting the first reference hinge portion 322a and the third hinge hole 321a forms with an imaginary rotation line B-B connecting the first claw portion 312a and the first reference hinge portion 322a may preferably be −30° to +15°.

The angle that the reference line A-A forms with the second rotation line B2-B2, i.e., the angle θ2 of FIG. 10b, may be determined by the length of the first region $320a_1$ of the first secondary lever connecting structure 320a.

That is, the first region $320a_1$ of the first secondary lever connecting structure 320a corresponds to the region from the first end portion 325a to the first reference hinge portion 322a, and the angle θ2 may increase until the first yoke member 310a abuts on the first end portion 325a.

For example, as the length of the first region $320a_1$ increases, the angle θ2 that the reference line A-A forms with the second rotation line B2-B2 gradually decreases. On the other hand, as the length of the first region $320a_1$ decreases, the angle θ2 that the reference line A-A forms with the second rotation line B2-B2 gradually increases.

Thus, according to the present invention, the angle θ2 that the reference line A-A forms with the second rotation line B2-B2 may be determined by the length of the first region $320a_1$, i.e., the length of the region from the first end portion 325a to the first reference hinge portion 322a.

The pivoting of the yoke member and the secondary lever according to the present invention will hereinafter be described in further detail.

As described above with reference to FIG. 1b, the wiper blade assembly 100 according to the present invention includes the secondary levers 300a and 300b disposed to be adjacent to the primary lever 200, and the secondary levers 300a and 300b include the first secondary lever 300a disposed at one end of the primary lever 200 and the second secondary lever 300 disposed at the other end of the primary lever 200.

The pivoting of the first yoke member 310a and the first secondary lever 300a will hereinafter be described, and the pivoting of the second yoke member 310b and the second secondary lever 300b may be understood from the description of the pivoting of the first yoke member 310a and the first secondary lever 300a.

FIG. 11 is a schematic cross-sectional view illustrating the first secondary lever according to the present invention.

For convenience, FIG. 11 illustrates only parts of the first secondary lever that are highly relevant to the description of the spirit of the present invention.

Referring to FIG. 11, the first secondary lever 300a has an inner side C on the inside thereof.

FIGS. 12a through 12c are views illustrating the limiting of the rotation angle of the yoke member by the secondary lever.

As described above, the first yoke member 310a may pivot on the first reference hinge portion 322a, and the rotation angle of the first yoke member 310a may be limited by the first secondary lever connecting structure 320a during the pivoting of the first yoke member 310a on the first reference hinge portion 322a.

The rotation angle of the first yoke member 310a by the first secondary lever 330a may be limited not only by the first secondary lever connecting structure 320a, but also by the first secondary lever 330a.

Specifically, as described above with reference to FIG. 10a, the first secondary lever connecting structure 320a includes the reference line A-A connecting the first reference hinge portion 322a and the third hinge hole 321a, and the first yoke member 310a includes the first rotation line B1-B1 connecting the first claw portion 312a and the first reference hinge portion 322a.

Also, as described above with reference to FIG. 10b, the first yoke member 310a includes the second rotation line B2-B2 connecting the first claw portion 312a and the first reference hinge portion 322a Also, as described above with reference to FIG. 10c, the first yoke member 310a includes the third rotation line B3-B3 connecting the first claw portion 312a and the first reference hinge portion 322a.

That is, the angle θ2 that the reference line A-A forms with the second rotation line B2-B2 is determined by the length of the first region 320a₁ of the first secondary lever connecting structure 320a, i.e., the length of the region from the first end portion 325a to the first reference hinge portion 322a.

The angle θ2 that the reference line A-A forms with the second rotation line B2-B2 is determined not only by the first region 320a₁ of the first secondary lever connecting structure 320a, but also by a state in which the first yoke member 310a is placed in contact with the inner side C of the first secondary lever 330a.

For example, FIG. 12a illustrates an example in which the first yoke member 310a and the first secondary lever connecting structure 320a in their pivoted state as illustrated in FIG. 10a are applied to the first secondary lever 300a. That is, FIG. 12a illustrates a state in which the first yoke member 310a is yet to be placed in contact with the inner side C of the first secondary lever 330a.

FIG. 12c illustrates an example in which the first yoke member 310a and the first secondary lever connecting structure 320a in their pivoted state as illustrated in FIG. 10c are applied to the first secondary lever 300a. That is, FIG. 12c illustrates a state in which the first yoke member 310a is yet to be placed in contact with the inner side C of the first secondary lever 330a.

On the other hand, FIG. 12b illustrates an example in which the first yoke member 310a and the first secondary lever connecting structure 320a in their pivoted state as illustrated in FIG. 10b are applied to the first secondary lever 300a. That is, FIG. 12b illustrates a state in which the first yoke member 310a is placed in contact with the inner side C of the first secondary lever 330a.

The reason that the rotation angle of the first yoke member 310a is limited by placing the first yoke member 310a in contact with the inner side C of the first secondary lever 330a is to allow for further improvements in the property of following the curvature of windshield glass in the contact member 400 to which the first yoke member 310a is coupled.

That is, in response to the first yoke member 310a being placed in contact with the inner side C of the first secondary lever 330a, the first yoke member 310a may be pressed by the inner side C of the first secondary lever 330a, and the force applied to the first yoke member 310a may be delivered to the contact member 400. As a result, the contact member 400's property of following the curvature of windshield glass may be further improved.

When the first yoke member 310a is placed in contact with the inner side C of the first secondary lever 330a, the first yoke member 310a may abut on the first end portion 325a so that the angle θ2 can reach its maximum.

For example, when the angle θ2 that the reference line A-A forms with the second rotation line B2-B2 reaches its maximum, the angle θ2 may be +15°, in which case, the first yoke member 310a may be placed in contact with the inner side C of the first secondary lever 330a.

However, when the yoke member 310a is placed in contact with the inner side C of the first secondary lever 330a, the angle θ2 may not necessarily reach its maximum. Rather, the angle θ2 may exceed 0°, but may not be greater than +15°.

That is, according to the present invention, even in a state in which the first yoke member 310a is additionally pivotable with respect to the first secondary lever connecting structure 320a (i.e., when the angle θ2 exceeds 0° and is not greater than +15°), the first yoke member 310a is placed in contact with the inner side C of the first secondary lever 330a, thereby further improving the contact member 400's property of following the curvature of windshield glass.

While exemplary embodiments have been shown and described above, it will be apparent to those skilled in the art that modifications and variations could be made without departing from the spirit and scope of the present invention as defined by the appended claims.

What is claimed is:

1. A wiper blade assembly comprising:
   a primary lever;
   a secondary lever disposed to be adjacent to the primary lever;
   a secondary lever connecting structure coupled to the secondary lever; and
   a yoke member hinge-coupled to the secondary lever connecting structure,
   wherein
   the primary lever includes a spoiler portion, the spoiler portion including a hinge axis portion in a certain region of one end portion of the spoiler portion,
   the secondary lever extends at least across an entire length of the yoke member,
   the secondary lever connecting structure includes
      a reference hinge portion disposed in a certain region of a first end portion of the secondary lever connecting structure,
      a claw portion disposed in a certain region of a second end portion of the secondary lever connecting structure, and
      a hinge hole positioned between the reference hinge portion and the claw portion of the secondary lever connecting structure, the hinge hole of the secondary lever connecting structure being hinge-coupled to the hinge axis portion of the spoiler portion of the primary lever, the secondary lever connecting structure being pivotable on the hinge axis portion such that the secondary lever can pivot from the spoiler portion,
   the yoke member includes claw portions disposed on respective end portions of the yoke member and a hinge hole positioned between the claw portions of the yoke member, the hinge hole of the yoke member being hinge-coupled to the reference hinge portion of the secondary lever connecting structure, the yoke member being pivotable on the reference hinge portion such that the claw portions of the yoke member can move apart from the secondary lever,
   a first rotation angle of the yoke member when the yoke member pivots in a first direction is limited by the secondary lever connecting structure, and
   a second rotation angle of the yoke member when the yoke member pivots in a second direction is limited by an inner side of the secondary lever.

2. The wiper blade assembly of claim 1, wherein
   the first rotation angle of the yoke member when the yoke member pivots in the first direction is 0° to −30°, and the second rotation angle of the yoke member when the yoke member pivots in the second direction is 0° to +15°.

3. The wiper blade assembly of claim 1, wherein the primary lever and the secondary lever include longitudinal grooves disposed in certain regions of respective top portions of the primary lever and the secondary lever.

4. The wiper blade assembly of claim 1, wherein the secondary lever connecting structure being inserted into an interior of the secondary lever to fix the secondary lever connecting structure to the secondary lever by interference fitting.

5. The wiper blade assembly of claim 4, wherein
the secondary lever includes a stopper portion in a certain region of the interior of the secondary lever, and
the secondary lever connecting structure includes a hole in a certain region of a top portion of the secondary lever connecting structure, the stopper portion of the secondary lever being inserted into the hole of the secondary lever connecting structure such that the secondary lever connecting structure is fixed to the secondary lever.

\* \* \* \* \*